US 6,627,344 B2

(12) United States Patent
Kang et al.

(10) Patent No.: US 6,627,344 B2
(45) Date of Patent: Sep. 30, 2003

(54) LITHIUM SECONDARY BATTERY AND METHOD OF MANUFACTURING THEREOF

(75) Inventors: Byoung-hyun Kang, Cheonan (KR); Jea-woan Lee, Cheonan (KR); Se-jong Han, Cheonan (KR); Yong-beom Lee, Cheonan (KR); Duck-chul Hwang, Cheonan (KR); In-sung Lee, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 136 days.

(21) Appl. No.: 09/797,732

(22) Filed: Mar. 5, 2001

(65) Prior Publication Data

US 2001/0019796 A1 Sep. 6, 2001

(30) Foreign Application Priority Data

Mar. 6, 2000 (KR) .......................................... 2000-11040

(51) Int. Cl.⁷ .......................... H01M 10/38; H01M 10/40
(52) U.S. Cl. .......................... 429/94; 429/300; 429/303
(58) Field of Search .......................... 429/94, 300, 303

(56) References Cited

U.S. PATENT DOCUMENTS 5,681,357 A * 10/1997 Eschbach et al. .......... 29/623.4
6,387,561 B1 * 5/2002 Nemoto et al. ................ 429/51
6,387,562 B1 * 5/2002 Akahira ....................... 429/163

FOREIGN PATENT DOCUMENTS

JP            6-96800         4/1994

OTHER PUBLICATIONS

Dominey, in Lithium Batteries, New Materials . . . Industrial Chemistry Library, vol. 5, 1994, G. Pistoia, ed. p. 145.*

* cited by examiner

Primary Examiner—Carol Chaney
(74) Attorney, Agent, or Firm—Staas & Halsey LLP

(57) ABSTRACT

A lithium secondary battery having a winding-type electrode assembly and a case accommodating the electrode assembly, and a method of manufacturing thereof. In the lithium secondary battery, ion-conductive polymer is contained in at least one of a hollow portion of the electrode assembly and an inner space of the case other than the hollow portion. The hollow portion and/or the inner space of the case of the electrode assembly is filled with ion-conductive polymer which can consume the heat generated in the battery and which is changed into a gel-state by an electrolytic solution, to dissipate the heat generated in the battery. Accordingly, the explosion of the battery can be suppressed, thereby preventing the reliability and safety of the battery from lowering.

19 Claims, 2 Drawing Sheets

LITHIUM SECONDARY BATTERY AND METHOD OF MANUFACTURING THEREOF

CROSS-REFERENCE TO RELATED APPLICATIONS

This application claims the benefit of Korean Application No. 00-11040, filed Mar. 6, 2000, in the Korean Patent Office, the disclosure of which is incorporated herein by reference.

BACKGROUND OF THE INVENTION

1. Field of the Invention

The present invention relates to a lithium secondary battery and method of manufacturing thereof, and more particularly, to a lithium secondary battery having improved safety and reliability by preventing explosion of the battery due to thermal runaway.

2. Description of the Related Art

Accompanying the technological development of portable electronic devices which have become miniaturized and lightweight, there has become a high demand for high performance secondary batteries for supplying power to those portable electronic devices.

In accordance with such demand, as a higher energy density battery, lithium secondary batteries have been rapidly developed to substitute for lead batteries or nickel-cadmium batteries.

The lithium secondary batteries have higher energy density and processibility (easily made into a desired shape such as a cylindrical case or a battery pack) and can be easily manufactured, compared to other conventional batteries, thereby being easily adapted for electronic appliances. Therefore, much attention has been paid to the lithium secondary batteries as the most promising type of batteries. A lithium secondary battery generally utilizes lithium nickel oxide, lithium cobalt oxide or lithium manganese oxide as a cathode active material, and carbon, metallic lithium or an alloy thereof as an anode active material thereof. Also, usable electrolytes include a polymer solid electrolyte based on a polymer matrix, such as liquid a organic electrolyte, e.g., polyethylene oxide, polyacrylonitrile or polyvinylidene fluoride.

Lithium secondary batteries are classified according to the kind of electrolyte used, into lithium ion batteries and lithium ion polymer batteries. The lithium ion batteries use a liquid electrolyte, whereas the lithium ion polymer batteries use a gel-type or solid electrolyte.

While the above-described lithium secondary batteries, compared to the other type batteries, have excellent lifetime and energy density characteristics, they may experience local internal shorting in the case where external shock, e.g., nail piercing, is applied thereto. Then, the temperature of the portion where the internal shorting has taken place increases intensively. In particular, if the internal shorting occurs at the active material layer formed on both surfaces of the electrode current collector, the internal temperature of the battery greatly rises. Also, when local shorting occurs, the separator cannot properly exert a shut-down function of suppressing current flow by suppressing migration of ions in the event of an increase in the internal temperature of the battery. Thus, the temperature rise due to local shorting causes thermal runaway, resulting in explosion of a battery.

FIG. 1 is a diagram showing a typical example of a cylindrical lithium ion battery.

Referring to FIG. 1, a cylindrical lithium secondary battery 10 includes a cylindrical case 15 and an electrode assembly 14 installed inside the case 15. Here, the electrode assembly 14 is constructed such that a separator 13 is interposed between a cathode 11 and an anode 12. A cap assembly 16 is connected to the upper portion of the electrode assembly 14.

A process for preparing the aforementioned cylindrical lithium ion battery will now be described.

First, in a state in which the separator 13 is interposed between a cathode plate 11 and the anode plate 12, the resultant is wound around a mandrel in a jelly-roll type configuration to fabricate the electrode assembly 14. Then, the mandrel is removed, the electrode assembly 14 is put into a space of the case 15 and then an electrolytic solution is injected. When injection of the electrolytic solution is completed, the cap assembly 16 is connected to the upper portion of the case 15, thereby completing the lithium ion battery shown in FIG. 1.

As described above, if the mandrel is removed, an empty space is left inside the electrode assembly. Conventionally, a center pin has been inserted into the empty space to assist in maintaining the shape of the electrode assembly.

However, insertion of the center pin has only a trivial effect in maintaining the shape of the electrode assembly 14 or expansion of the electrode assembly 14. Thus, currently, the empty space is allowed to exist at it is, to be used as an electrolytic solution inlet, a tip passage for welding an anode tap, or a gas existence area.

In order to increase the effective space of a battery, a method in which the empty space of a battery is reduced by reducing the diameter of the mandrel, has been proposed. However, according to this method, there is a risk of an electrode plate being cut during winding. Thus, since it is impossible to reduce the diameter of the mandrel to a predetermined level or below, the space remaining after removing the mandrel is necessarily left over.

SUMMARY OF THE INVENTION

To solve the above problems, it is an object of the present invention to provide a lithium secondary battery having improved reliability and safety by absorbing internal heat of the battery using an empty space of an electrode assembly to prevent explosion of the battery.

Additional objects and advantages of the invention will be set forth in part in the description which follows, and, in part, will be obvious from the description, or may be learned by practice of the invention.

To achieve the above and other objects, there is provided a lithium secondary battery having a winding-type electrode assembly and a case accommodating the electrode assembly, wherein ion-conductive polymer is contained in at least one of a hollow portion of the electrode assembly and an inner space of the case other than the hollow portion.

The ion-conductive polymer is preferably a material gelled by a non-aqueous electrolytic solution.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

The feature of the present invention lies in that, ion-conductive polymer is injected into a hollow portion of an electrode assembly wound in a jelly-roll type configuration and/or an inner space of a case accommodating the electrode assembly other than the hollow portion. Here, in particular, the ion-conductive polymer is preferably a material which is dissolved in an electrolytic solution for gelation. The ion-conductive ion polymer having such a property can absorb heat generated in the battery. Even if the ion-conductive polymer is excessively injected into the battery, the performance of the battery is not adversely affected. Usable polymers having such properties include at least one selected from the group consisting of polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene copolymer and derivatives of these polymers. The ion-conductive polymer is advantageously added in the form of powder in view of working efficiency.

An exemplary lithium secondary battery according to the present invention will now be described with reference to FIG. 2.

Figure 1:
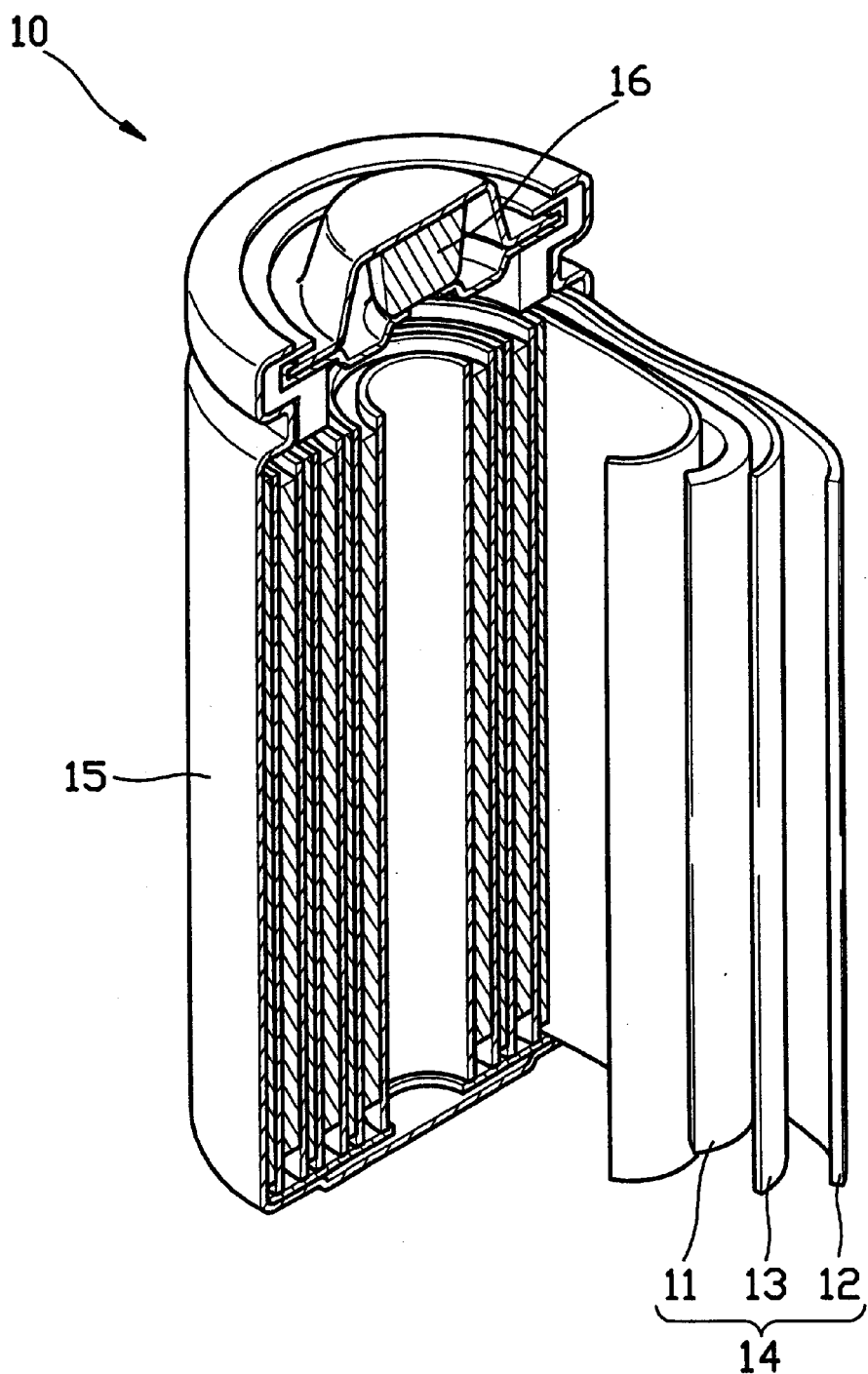
FIG. 1 is a partially exploded perspective view illustrating a conventional cylindrical lithium ion battery.
Figure 2:
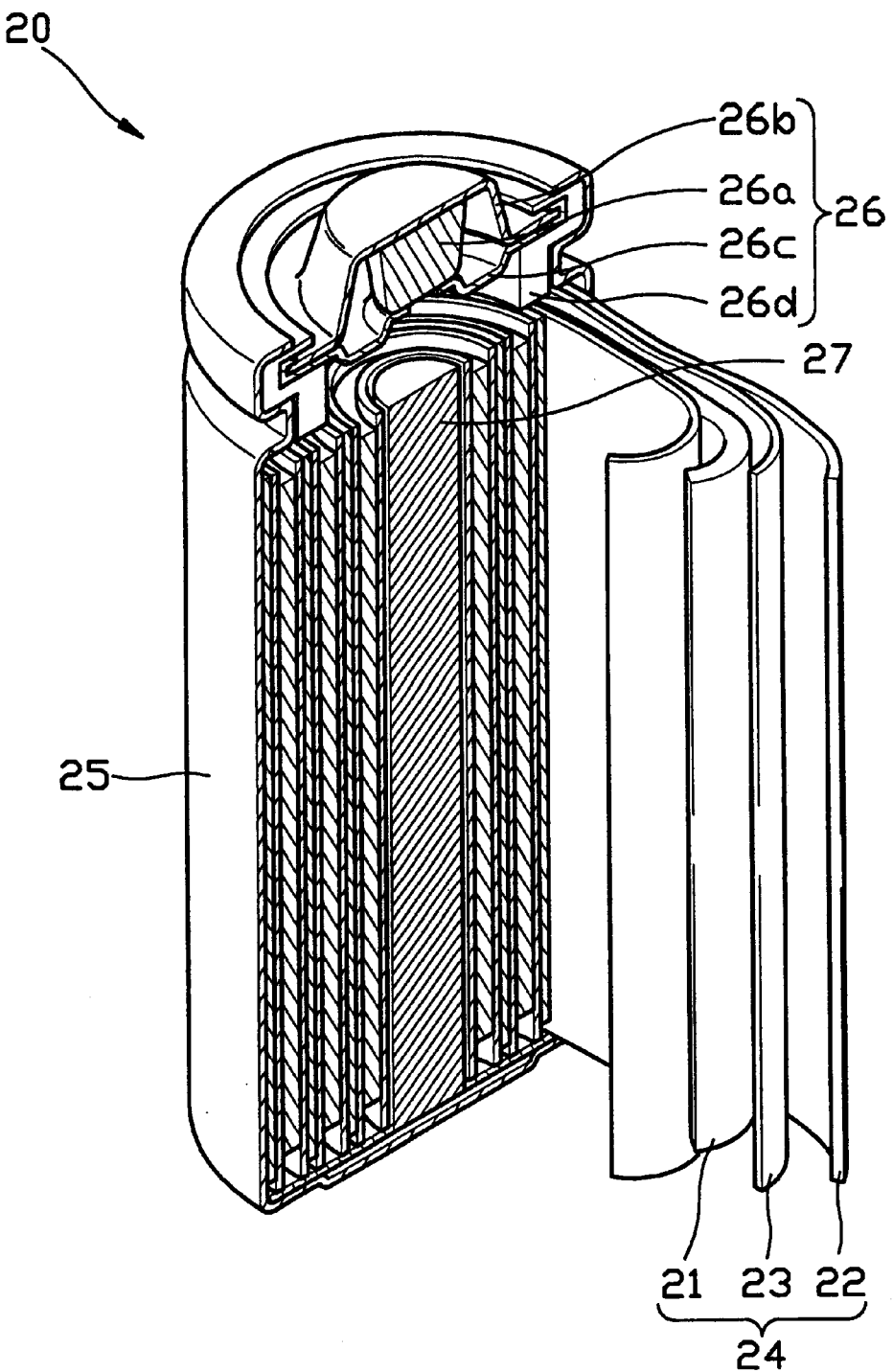
FIG. 2 is a partially exploded perspective view illustrating a lithium ion battery according to an embodiment of the present invention.

FIG. 2 is a partially exploded perspective view illustrating a lithium ion battery according to the present invention. Referring to FIG. 2, a lithium ion battery 20 includes an electrode assembly 24 wound around a mandrel (not shown) in a jelly-roll type configuration, and comprising a cathode 21, an anode 22 and a separator 23 for insulating the cathode 21 and the anode 22 from each other. Also, a cylindrical case 25 having a space for accommodating the electrode assembly 24 is provided. A cap assembly 26 connected to the case 25, for hermetically sealing the inside thereof to prevent leakage of an electrolytic solution, is connected to the upper portion of the case 25. Here, the cap assembly 26 includes a cap 26b having a vent 26a provided inside. The cap 26b contacts a cap cover 26c towards a periphery of the top portion of the lithium ion battery 20 and a periphery of the cap cover 26c wraps around a circumference of the cap 26b. A gasket 26d contacts a lower surface of the cap cover 26c, and wraps around the periphery of the cap cover 26c.

In the electrode assembly 24, the hollow portion produced by removing the mandrel from the electrode assembly is filled with ion-conductive polymer 27. The ion-conductive polymer 27 exists in a gel state due to the electrolytic solution.

The process for fabricating the aforementioned battery according to the present invention will now be described.

First, the cathode 21, the anode 22 and the separator 23 are prepared, and the separator 23 is interposed between the cathode 21 and the anode 22. In such a state, winding is performed around the mandrel in a jelly-roll type configuration, thereby fabricating the electrode assembly 24.

Subsequently, the electrode assembly 24 is put into the space of the case 25 and then the mandrel is removed from the electrode assembly 24. Thereafter, ion-conductive polymer powder is injected into the hollow portion produced by removing the mandrel from the electrode assembly 24. Here, the content of the ion-conductive polymer is variable according to the amount of injected electrolytic solution.

Then, the electrolytic solution is injected into the hollow portion of the electrode assembly 24 and the space of the case 25 having the electrode assembly 24. The electrolytic solution injection process is carried out such that the inside of the battery case 25 is made to be a vacuum and then the electrolytic solution is injected into the case 25 while maintaining a predetermined injection pressure by means of an electrolytic solution injecting apparatus.

In the present invention, the ion-conductive polymer can be injected into the hollow portion and/or the unused inner space of the case 25 other than the pores of the electrode plate and the separator. If the ion-conductive polymer is only injected into the hollow portion, the ion-conductive polymer may be moved into the inner space after the electrolytic solution is injected.

If the injection of the electrolytic solution is completed, the cap assembly 26 is connected to the upper portion of the case 25, thereby completing the lithium ion battery 20 according to the present invention. If the electrolytic solution is injected in such a manner, the ion-conductive polymer powder injected into the hollow portion of the electrode assembly 24 is gelled to form a cylindrical ion-conductive polymer member 27.

Then, in order to impart good charging/discharging characteristics to the lithium ion battery 20 assembled in the above-described manner, a forming process in which charging and discharging are repeatedly performed, is performed.

As shown in FIG. 2, if the gel-state ion-conductive polymer 27 exists in the hollow portion of the electrode assembly 24 and/or the inner space of the case 25, the reliability and safety of the battery are improved based on the following operational principle. The inner space of the case 25 refers to any unused space inside the case 25 accommodating the electrode assembly 24, other than the hollow portion (e.g., the spaces between the cathode, separator and anode.)

In other words, the ion-conductive polymer injected into the empty spaces of an electrode assembly and a case, absorbs the heat generated due to internal shorting of a battery, thereby preventing overheating of the lithium ion battery and thermal runaway.

The electrolytic solution used in the present invention is the one conventionally used for lithium secondary batteries. The electrolytic solution is composed of a lithium salt and an organic solvent. The organic solvent is at least one solvent selected from the group consisting of propylene carbonate, ethylene carbonate, γ-butyrolactone, 1,3-dioxolane, dimethoxyethane, dimethyl carbonate, methylethyl carbonate, diethyl carbonate, tetrahydrofuran, dimethyl sulfoxide and polyethylene glycol dimethyl ether. The content of the solvent is in the conventional range. The lithium salt is at least one ionic lithium salt selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonyl amide ($LiN(CF_3SO_2)_2$), and the content thereof is in the conventional range.

The present invention will now be described through the following examples and is not limited thereto.

The amount of the ion-conductive polymer is 8 to 50 parts by weight based on the 100 parts by weight electrolytic solution. If the amount of the ion-conductive polymer is less than 8 parts by weight, the effect obtained by using the ion-conductive polymer is trivial. Also, if the amount of the ion-conductive polymer exceeds 50 parts by weight, the electrolytic solution excessively permeates the ion-conductive polymer, rendering the total amount of the electrolytic solution in the battery insufficient.

EXAMPLE 1

Lithium nickel cobalt oxide, carbon black, vinylidenefluoride-hexafluoropropylene copolymer and a solvent were mixed to prepare a cathode active material composition to then be coated on an aluminum foil. Subsequently, the resultant material was dried, rolled and cut, thereby fabricating a cathode.

Separately, graphite powder, vinylidenefluoride-hexafluoropropylene copolymer and a solvent were mixed to prepare an anode active material composition to then be coated on a copper foil. Subsequently, the resultant material was dried, rolled and cut, thereby fabricating an anode.

A polyethylene separator was interposed between the cathode and the anode and then wound in a jelly-roll type configuration around a mandrel to fabricate an electrode assembly. The fabricated electrode assembly was put into a space of a cylindrical case, and then a mandrel was removed from the electrode assembly.

Thereafter, polyvinyl acetate powder was injected into a hollow portion produced by removing the mandrel from the electrode assembly. Next, an electrolytic solution is injected into the hollow portion of the electrode assembly and the space of the case accommodating the electrode assembly, thereby completing a cylindrical lithium ion battery. Here, 4.0 to 4.5 g of an electrolytic solution obtained by dissolving 1.3 M $LiPF_6$ in a solvent of ethylene carbonate and dimethyl carbonate in the mixture ratio by weight of 1:1, was used.

EXAMPLES 2–14

A cylindrical lithium ion battery was completed in the same manner as in Example 1, with the exception of vinylidene fluoride-hexafluoropropylene copolymer, polyether, polyethylene oxide, polyacrylonitrile, polyvinylidene fluoride, polymethyl methacrylate, polyvinyl alcohol, polymethacrylonitrile, polyvinylpyrrolidone, polyethyleneimine, polybutadiene, polystyrene and polyisoprene, being used, respectively, instead of polyvinyl acetate.

COMPARATIVE EXAMPLE

A cylindrical lithium ion battery was completed in the same manner as in Example 1, with the exception being that the space produced by removing a mandrel from an electrode assembly was retained.

The standard capacities of the lithium ion batteries prepared by Examples 1 through 14 and Comparative Example were all 2300 mAh, and piercing tests therefor were carried out. Here, the piercing tests were carried out to examine explosion of the batteries such that the batteries were standard-charged, then be allowed to stand for 10 to 72, minutes and then a nail was pierced through the center of each battery perpendicularly to the lengthwise shaft of the battery.

The test results showed that none of each of five lithium ion batteries prepared by Examples 1 through 14 experienced explosion by nail piercing, while all of five batteries prepared by the Comparative Example experienced explosion.

In the lithium secondary battery according to the present invention, a hollow portion of the electrode assembly is filled with ion-conductive polymer which can consume the heat generated in the battery and which is changed into a gel-state by an electrolytic solution, to dissipate the heat generated in the battery. Accordingly, the explosion of the battery can be suppressed, thereby preventing the reliability and safety of the battery from being lowered.

Although the present invention has been described with reference to the preferred examples, the foregoing disclosure should be interpreted as illustrative only and it should be understood that various modifications and variations can be easily made by those skilled in the art without departing from the spirit of the invention. Accordingly, a true scope and spirit of the invention should be defined by the following claims.

What is claimed is:

1. A lithium secondary battery comprising:
   a winding-type electrode assembly;
   a case accommodating the electrode assembly; and
   ion-conductive polymer contained in at least one of an inner space defined by the electrode assembly and an inner space defined by the case other than the inner space of the electrode assembly,
   wherein the ion-conductive polymer comprises an ion-conductive polymer powder that is injected into the inner space of the electrode assembly and is gelled by injecting an electrolytic solution into the inner space of the electrode assembly and the inner space of the case to form the ion-conductive polymer.

2. The lithium secondary battery according to claim 1, wherein the ion-conductive polymer is a material gelled by a non-aqueous electrolytic solution.

3. The lithium secondary battery according to claim 2, wherein the non-aqueous electrolytic solution contains a lithium salt and an organic solvent, the organic solvent being at least one solvent selected from the group consisting of propylene carbonate, ethylene carbonate, γ-butyrolactone, 1,3-dioxolane, dimethoxyethane, dimethyl carbonate, methylethyl carbonate, diethyl carbonate, tetrahydrofuran, dimethyl sulfoxide and polyethylene glycol dimethyl ether, and the lithium salt being at least one selected from the group consisting of lithium perchlorate (LiClO$_4$), lithium tetrafluoroborate (LiBF$_4$), lithium hexafluorophosphate (LiPF$_6$), lithium trifluoromethanesulfonate (LiCF$_3$SO$_3$) and lithium bistrifluoromethanesulfonyl amide (LiN(CF$_3$SO$_2$)$_2$).

4. The lithium secondary battery according to claim 1, wherein the ion-conductive polymer is at least one selected from the group consisting of polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene copolymer and derivatives of these polymers.

5. The lithium secondary battery according to claim 3, wherein the ion-conductive polymer is at least one selected from the group consisting of polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene copolymer and derivatives of these polymers.

6. The lithium secondary battery according to claim 1, wherein the electrode assembly comprises:
   a cathode;
   an anode; and
   a separator separating the cathode and the anode;
   wherein the cathode, the separator and the anode are in a jelly-roll type configuration.

7. The lithium secondary battery according to claim 4, wherein the electrode assembly comprises:
   a cathode comprising a mixture nickel cobalt oxide, carbon black, vinylidenefluoride-hexafluoropropylene copolymer and a solvent coated on an aluminum foil;
   an anode comprising a mixture of graphite powder, vinylidenefluoride-hexafluoropropylene copolymer and a solvent coated on a copper foil; and
   a separator, separating the cathode and the anode, and made of polyethylene.

8. The lithium secondary battery according to claim 5, wherein the electrode assembly comprises:
   a cathode comprising a mixture nickel cobalt oxide, carbon black, vinylidenefluoride-hexafluoropropylene copolymer and a solvent coated on an aluminum foil;
   an anode comprising a mixture of graphite powder, vinylidenefluoride-hexafluoropropylene copolymer and a solvent coated on a copper foil; and
   a separator, separating the cathode and the anode, and made of polyethylene.

9. The lithium secondary battery of claim 3, wherein the LiPF6 is dissolved in the solvent of ethylene carbonate and dimethyl carbonate in a mixture ratio by weight of 1:1.

10. A lithium secondary battery comprising:
    an electrode assembly formed in a jelly-roll configuration;
    a case accommodating the electrode assembly; and
    a gel of ion-conductive polymer positioned in an inner space defined by the jelly-roll configuration of the electrode assembly,
    wherein the ion-conductive polymer comprises an ion-conductive polymer powder that is injected into the inner space of the electrode assembly and is gelled by injecting an electrolytic solution into the inner space of the electrode assembly and the inner space of the case to form the ion-conductive polymer.

11. A method of manufacturing a lithium secondary battery comprising:
    winding an electrode assembly to have an inner space;
    placing the electrode assembly in a cylindrical case;
    injecting an ion-conductive polymer into at least one of the inner space defined by the electrode assembly and an inner space defined by the cylindrical case other than the inner space of the electrode assembly,
    wherein the injecting comprises:
       injecting an ion-conductive polymer powder into the inner space of the electrode assembly, and
       injecting an electrolytic solution into the inner space of the electrode assembly and the inner space of the cylindrical case, wherein the electrolytic solution gels the ion-conductive polymer powder to form the ion-conductive polymer.

12. The method of claim 11, wherein:
    the winding of the electrode assembly comprises winding the electrode assembly around a mandrel; and
    the placing of the electrode assembly comprises removing the mandrel to form the inner space of the electrode assembly after placing the electrode assembly in the cylindrical case.

13. The method according to claim 11, wherein the ion-conductive polymer is at least one selected from the group consisting of polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene copolymer and derivatives of these polymers.

14. The method according to claim 11, wherein the ion-conductive polymer is at least one selected from the group consisting of polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene copolymer and derivatives of these polymers.

15. The method according to claim 14, wherein the electrolytic solution contains a lithium salt and an organic solvent, the organic solvent being at least one solvent selected from the group consisting of propylene carbonate, ethylene carbonate, γ-butyrolactone, 1,3-dioxolane, dimethoxyethane, dimethyl carbonate, methylethyl carbonate, diethyl carbonate, tetrahydrofuran, dimethyl sulfoxide and polyethylene glycol dimethyl ether, and the lithium salt being at least one selected from the group consisting of lithium perchlorate (LiClO$_4$), lithium tetrafluoroborate (LiBF$_4$), lithium hexafluorophosphate (LiPF$_6$), lithium trifluoromethanesulfonate (LiCF$_3$SO$_3$) and lithium bistrifluoromethanesulfonyl amide (LiN(CF$_3$SO$_2$)$_2$).

16. The method according to claim 13, further comprising:

mixing nickel cobalt oxide, carbon black, vinylidenefluoride-hexafluoropropylene copolymer and a solvent to produce a first mixture and coating the first mixture on an aluminum foil, to form the cathode;

mixing graphite powder, vinylidenefluoride-hexafluoropropylene copolymer and a solvent to form a second mixture, coating the second mixture on a copper foil, and drying rolling and cutting the resultant, to form the anode; and interposing a polyethylene separator between the cathode and the anode.

17. The method according to claim 14, further comprising:

mixing nickel cobalt oxide, carbon black, vinylidenefluoride-hexafluoropropylene copolymer and a solvent to produce a first mixture and coating the first mixture on an aluminum foil, to form the cathode;

mixing graphite powder, vinylidenefluoride-hexafluoropropylene copolymer and a solvent to form a second mixture, coating the second mixture on a copper foil, and drying rolling and cutting the resultant, to form the anode; and interposing a polyethylene separator between the cathode and the anode.

18. The method according to claim 15, further comprising:

mixing nickel cobalt oxide, carbon black, vinylidenefluoride-hexafluoropropylene copolymer and a solvent to produce a first mixture and coating the first mixture on an aluminum foil, to form the cathode;

mixing graphite powder, vinylidenefluoride-hexafluoropropylene copolymer and a solvent to form a second mixture, coating the second mixture on a copper foil, and drying rolling and cutting the resultant, to form the anode; and interposing a polyethylene separator between the cathode and the anode.

19. The method according to claim 15, further comprising dissolving the lithium salt $LiPF_6$ in the solvent of ethylene carbonate and dimethyl carbonate in a mixture ratio by weight of 1:1, to produce the electrolytic solution.

* * * * *